United States Patent [19]

Mueller et al.

[11] Patent Number: 4,905,797
[45] Date of Patent: Mar. 6, 1990

[54] CENTRIFUGAL BRAKE

[75] Inventors: Robert Mueller, Moensheim; Klaus Gausrab, Ostfildern, both of Fed. Rep. of Germany

[73] Assignee: Dr. Ing. h.c.F. Porsche AG, Weissach, Fed. Rep. of Germany

[21] Appl. No.: 306,157

[22] Filed: Feb. 6, 1989

[30] Foreign Application Priority Data

Feb. 4, 1988 [DE] Fed. Rep. of Germany ....... 3803290

[51] Int. Cl.$^4$ ............................................. F16D 59/00
[52] U.S. Cl. .................................................. 188/184
[58] Field of Search ................... 188/136, 180, 181 R, 188/184, 185

[56] References Cited

U.S. PATENT DOCUMENTS

| 1,279,632 | 9/1918 | Adams ................................ 188/184 |
| 1,791,458 | 2/1931 | Whittingham .................. 188/184 X |
| 2,499,533 | 3/1950 | Sohlberg ............................. 188/184 |

FOREIGN PATENT DOCUMENTS 1253593 11/1967 Fed. Rep. of Germany .

Primary Examiner—Duane A. Reger
Attorney, Agent, or Firm—Barnes & Thornburg

[57] ABSTRACT

A centrifugal brake is disclosed which comprises centrifugal shoes which cooperate with supplemental weights. Each supplemental weight has a ring-type basic shape and, by means of a ring part, extends along the centrifugal shoe to be affected. In addition, the supplemental weight interacts with the centrifugal shoe by way of a transmission element and a support part.

9 Claims, 1 Drawing Sheet

U.S. Patent  Mar. 6, 1990  4,905,797
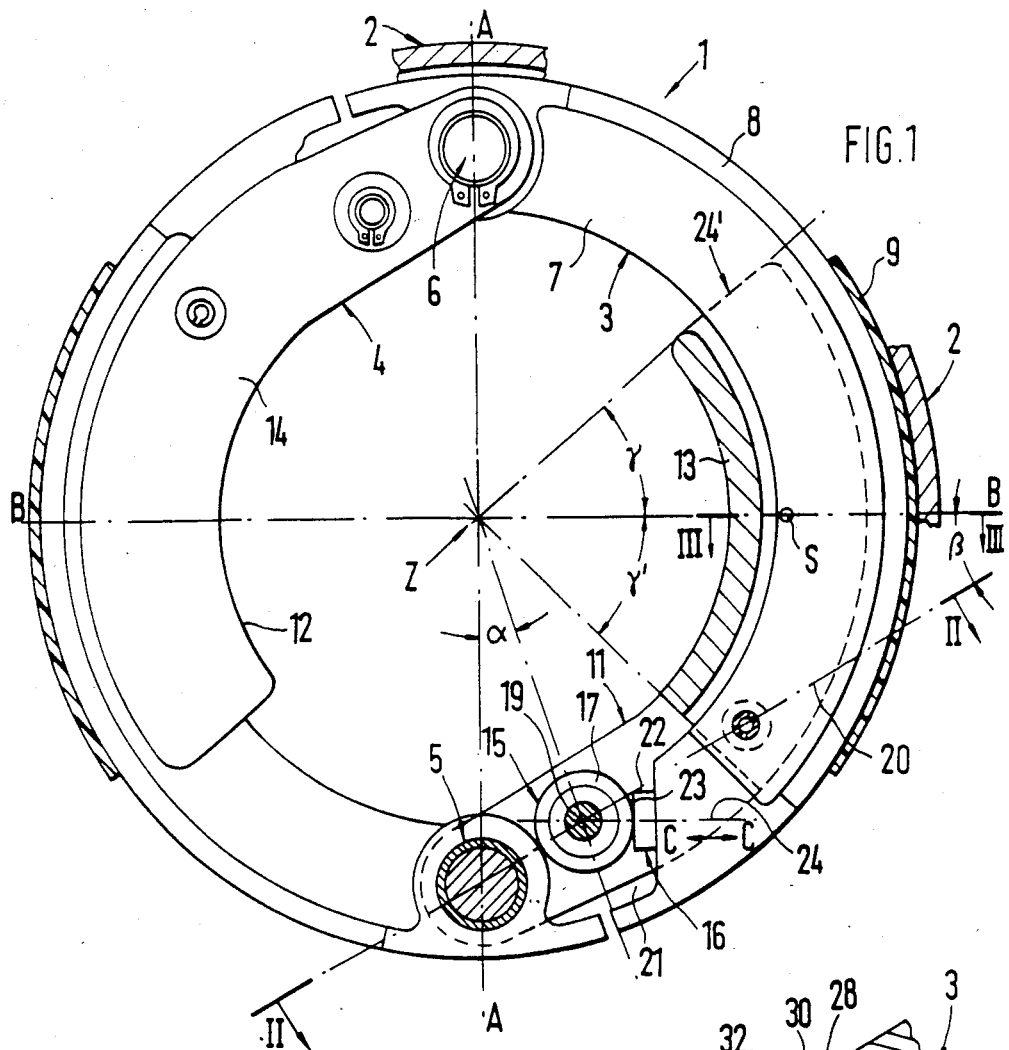
FIG. 1
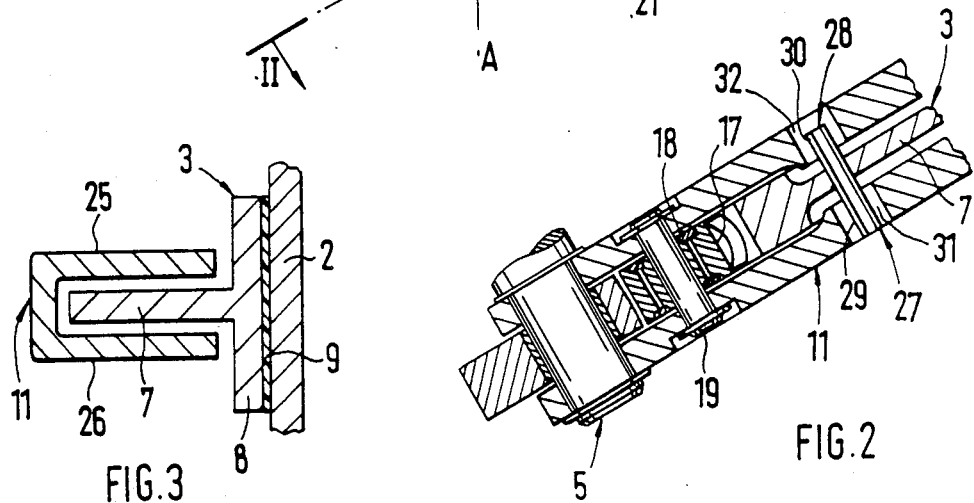
FIG. 3
FIG. 2

CENTRIFUGAL BRAKE

BACKGROUND AND SUMMARY OF THE INVENTION

The invention relates to a centrifugal brake for a locking system in a longitudinal drive line of a four-wheel drive vehicle, which brake has a circular-cylindrical housing and at least two ring-type centrifugal shoes which are pivotally connected by means of pivot bearings and interact with swivelling supplemental weights.

In a known centrifugal brake—German Published Examined Application (DE-AS) 1 253 593—the supplemental weights which interact with the centrifugal shoes are formed by triangular swivelling disks, which, by means of tension springs, are held in a normal position. This construction has the disadvantage that narrow limits are set concerning the ratio between the supplemental weights and the centrifugal shoes as a result of frictional conditions and self-locking. Furthermore, the centrifugal masses of the supplemental weights are relatively close to the swivel point of the centrifugal brake, whereby only small centrifugal forces can be generated. Finally, the supplemental weights result in relatively high constructional expenditures, and a large space is required.

It is an object of the invention to provide a highly effective centrifugal brake, the centrifugal weights and supplemental weights of which are designed to be such that high braking torques can be generated with a relatively small outside diameter and small masses of the centrifugal brake. However, it should also be ensured in this case that the components of the centrifugal brake are uncomplicated, require little space and can be easily integrated into the centrifugal brake.

According to the invention, this object is achieved by providing an arrangement wherein each supplemental weight has a ring-type basic shape and, by means of a ring part, extends along the centrifugal shoe to be affected, and wherein the supplemental weight, by means of a transmission element, acts upon a support part which is preferably arranged adjacent to a free end of the centrifugal shoe.

Principal advantages achieved by means of the invention are that the supplemental weights, with their ring parts, create favorable mass ratios and require little space. In this case, the outside diameter of the centrifugal brake can be kept small, although high braking torques can be generated. In addition, the supplemental weights, the transmission elements and the support parts are easily produceable parts.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of a centrifugal brake, constructed in accordance with a preferred embodiment of the invention;

FIG. 2 is a sectional view taken along Line II—II of FIG. 1; and

FIG. 3 is a schematic sectional view taken along Line III—III of FIG. 1.

DETAILED DESCRIPTION OF THE DRAWING

The centrifugal brake 1 is, for example, a component of a locking system for a motor vehicle with four-wheel drive. A locking system of this type is described in detail in German Patent No. (DE-PS)3 507 490.

The centrifugal brake 1, which rotates around a center Z, is housed in a circular-cylindrical housing 2 and comprises two ring-type centrifugal shoes 3, 4, which are defined by radii from the direction of Z and which are pivotally connected to pivot bearings 5, 6. The pivot bearings 5, 6 are mounted adjacent to the housing 2 at opposite sides, specifically on a vertical center plane A—A of FIG. 1, which includes the center Z.

Each centrifugal shoe 3 consists of a light-metal alloy, has a T-shaped cross-section and has a web 7 as well as a lining support 8. The lining support 8 is equipped with a brake lining 9 which extends between the lining support 8 and the housing 2.

Supplemental weights 11, 12 cooperate with the centrifugal shoes 3, 4 and, relative to the centrifugal shoes, carry out a movement in the opposite direction, and have a ring-type basic shape. This shape is also defined by radii from the direction of Z. In this case, the supplemental weights 11, 12, which consist of a ferrous-metal material, such as cast iron, are equipped with ring parts 13, 14 extending along the centrifugal shoes 3, 4 which are to be affected by them. In addition, the supplemental weights 11, 12 are pivotally connected at the pivot bearings 5, 6 such that the respective supplemental weight 11 or 12 is disposed at the pivot bearing 5 or 6 of the centrifugal shoe 3 or 4 which is not affected by it.

A transmission element 15 and a support part 16 are provided between the supplemental weights 11 and the centrifugal shoe 3. Both are mounted in proximity of the pivot bearing 5 of the supplemental weight 11. The transmission element 15 is a roller 17 which, by way of a needle bearing 18, is disposed on a bolt 19. The bolt 19 is held at the supplemental weight 11 and is arranged at an angle $\alpha$ ($=20°$) to it with respect to the center Z as well as to the central longitudinal plane A—A. In addition, it is located on a line 20 which intersects with the center of the pivot bearing 5 and extends at an angle $\beta$ ($=30°$) with respect to a horizontal central longitudinal plane B—B which includes the center Z.

The support part 16 is mounted at the centrifugal brake 3, specifically adjacent to its free end 21, in which case it is represented by a pin 22 which is limited by a stop 23. The stop 23 cooperates with the outer circumference of the roller 17. A center line 24 of the pin 22, which, in axial direction C—C, can be adjusted, for example, by means of a thread, 33 provided on a shaft of the pin 22 which cooperates with a threaded bore 34 extends in parallel to the central longitudinal plane B—B and is aligned with the center of the bolt 19.

The ring part 13 extends beyond the central longitudinal plane B—B, and its free end 24' is defined by the angle $\alpha$ ($=45°$) starting from the center Z. In an area, which includes the angles $\alpha$ and $\alpha'$, the ring part 13 of the supplemental weight 11 is shaped as a U-profile in its cross-section. The web 7 of the centrifugal shoe 3 extends between legs 25 and 26 of the U-profile. As a result of this design, the center of gravity S of the supplemental weight 11 is located on the central longitudinal plane B—B.

A fixing device has the reference number 27 and, being arranged on line 20, acts between the centrifugal shoe 3 and the supplemental weight 11. The fixing device 27 comprises a pin 28, which is fixed at the web 7 of the centrifugal shoe 3. The pin 28 has sections 29, 30 which project beyond the web 7 and rest in openings 31, 32. The diameters of the openings 31, 32 are larger than the diameters of the sections 29, 30.

Thus, as centrifugal brake 1 rotates around center z, the weights 11, 12 are driven towards an outside of the brake 1. Due to the location of the transmission element 15, close to the pivot point of the associated weight 11, 12 and the location of the support part 16 at a distance from the pivot point of the associated shoe 3, 4, a large force is applied to the shoe.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A centrifugal brake for a locking system comprising a planetary transmission which is installed in a longitudinal drive line of a four wheel drive vehicle, the centrifugal brake comprising:
a circular cylindrical housing;
at least two ring-type centrifugal shoes which are pivotally mounted within the circular cylindrical housing by pivot bearings;
swivelling supplemental weights which interact with the centrifugal shoes, each supplemental weight having a ring-type basic shape, a ring part which extends along an associated centrifugal shoe to be affected and, at least over a partial area of the associated centrifugal shoe to be affected, a profile which is U-shaped in cross-section, a web of the associated centrifugal shoe extending between legs of the profile;
a support part arranged adjacent to a free end of the associated centrifugal shoe; and
a transmission element by which the supplemental weight acts on the supporting part.

2. A centrifugal brake according to claim 1, wherein the supplemental weight is pivoted at the pivot bearing of the centrifugal shoe which is not affected by it.

3. A centrifugal brake according to claim 1, wherein the transmission element and the support element are arranged adjacent to the pivot bearing of the supplemental weight.

4. A centrifugal brake according to claim 3, wherein the transmission element is a roller, the outer circumference of which roller cooperates with a stop of the support element.

5. A centrifugal brake according to claim 4, wherein the support element is a pin which is aligned with the roller.

6. A centrifugal brake according to claim 4, wherein a needle bearing is used for supporting the roller.

7. A centrifugal brake according to claim 1, wherein a fixing device is provided between each centrifugal shoe and the pertaining supplemental weight which fixes them in a normal position.

8. A centrifugal brake according to claim 7, wherein the fixing device is a pin, which is fixed in the web of the centrifugal shoe, the sections of this pin, which project beyond the web, projecting into openings of the legs of the supplemental weight, the diameter of the openings being larger than the diameter of the sections.

9. A centrifugal brake according to claim 1, wherein the centrifugal shoes consist of a light-metal material and the supplemental weights consist of a ferrous-metal material.

* * * * *